United States Patent Office 2,967,194
Patented Jan. 3, 1961

2,967,194
4-TRIFLUOROMETHYLSALICYLAMIDES

Murray Hauptschein, Glenside, Pa., assignor to Pennsalt Chemicals Corporation, Philadelphia, Pa., a corporation of Pennsylvania No Drawing. Filed May 15, 1958, Ser. No. 735,643

6 Claims. (Cl. 260—473)

This invention relates to novel amino derivatives of 4-trifluoromethylsalicylic acid. Particularly it relates to compounds represented by the formula

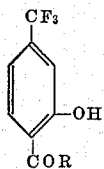

wherein R includes amino, phenylamino, hydrazino (aminoamino), and hydroxylamino. More particularly it relates to 4-trifluoromethylsalicylamide (I), 4-trifluoromethylsalicylanilide (II), 4-trifluoromethylsalicylic acid hydraxide (III), and 4-trifluoromethylsalicylhydroxamic acid (IV), as shown in Table I.

TABLE I

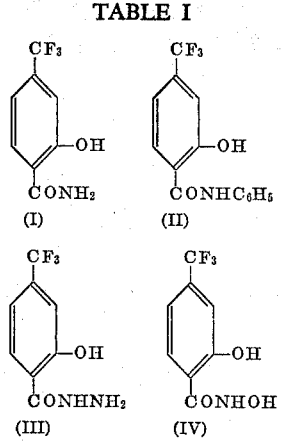

This application is a continuation-in-part of Serial No. 447,390, filed August 2, 1954, now abandoned.

The amino derivatives of 4-trifluoromethylsalicylic acid of this invention are useful as anti-mildew and anti-fungal agents. They are also useful as chemical intermediates for the preparation of other derivatives of 4-trifluoromethylsalicylic acid wherein the amino group is coupled to other molecular structures to form other fungicidal compounds. The amino compounds are additionally useful as antioxidants and corrosion inhibitors in lubricating oils.

The compounds of this invention are derived in general from 4-trifluoromethylsalicylic acid which is disclosed and claimed in said parent application. They are prepared by replacing the hydroxyl radical of the carboxyl group of said 4-trifluoromethylsalicylic acid directly or indirectly with an amino or substituted amino group derived from known reagents by procedures known in the art, as shown in the examples which follow.

The following examples of the preparation of my novel compounds are presented for the purpose of illustrating the invention, and it is to be understood that the invention is not to be restricted to these examples.

Example 1.—4-trifluoromethylsalicyl anilide

A mixture of 10.3 g. of 4-trifluoromethylsalicylic acid, 5.12 g. of aniline and 15 cc. of dimethylaniline was heated at 100° C. until the acid dissolved, and 5 cc. of phosphorous trichloride were added dropwise with stirring during ten minutes. The mixture was heated at 100–105° C. for an additional half-hour and then poured while hot into a worm solution of 50 ml. concentrated hydrochloric acid and 200 ml. of water with vigorous stirring. The crude solid (10 g., 71% yield), was washed with bicarbonate, dissolved in alkali and reprecipitated with acid. After several recrystallizations from 50% aqueous alcohol and decolorization with charcoal, pure 4-fluoromethylsalicyl anilide, M.P. 189–190° C. (white powder), was obtained.

Analysis.—Calcd. for $C_{14}H_{10}O_2NF_3$: C, 59.79; H, 3.58; N, 4.98. Found: C, 59.69; H, 3.72; N, 4.94.

In preparing the amino, hydrazino, and hydroxylamino derivatives of 4-trifluoromethylsalicylic acid, the 4-fluoromethylsalicylic acid is first converted to its methyl derivative as shown in Example 2 and the latter methyl-4-trifluoromethylsalicylate is then converted to the respective amino derivatives as shown in Examples 3, 4, and 5.

Example 2.—Methyl 4-trifluoromethylsalicylate

Twenty and six-tenths grams of 4-trifluoromethylsalicylic acid were esterified with 35 ml. of methanol in the presence of 3.5 ml. of concentrated sulfuric acid at the reflux temperature for 6 hours. Upon working up in the usual manner, there was isolated in 80% yield (75% conversion), methyl-4-trifluoromethylsalicylate, B.P. 223° C. (760 mm.) 97° C. (10 mm.), F.P. ca. 21° C. This ester has a root beer odor, is miscible with ethanol, and very slightly soluble in water.

Analysis.—Calcd. for $C_9H_7O_3F_3$: C, 49.10; H, 3.21. Found: C, 49.23; H, 3.29.

Example 3.—4-trifluoromethylsalicylamide

Ten grams of methyl 4-trifluoromethylsalicylate were introduced slowly into a three-necked flask containing 100 g. of concentrated ammonia and 0.4 g. of powdered aluminum and heated with stirring at 70° C. for two and one-quarter hours. Upon neutralization with a slight excess of concentrated hydrochloric acid, 9 g. (97% yield) of crude 4-trifluoromethylsalicylamide (M.P. 140–144° C.) were isolated. The solid was washed with dilute sodium bicarbonate to remove possible traces of organic acid. The precipitate was then redissolved upon acidification. Upon decolorization with charcoal and repeated crystallization from aqueous alcohol, slightly pink needles of M.P. 149–151° C. were obtained.

Analysis.—Calcd. for $C_8H_6O_2NF_3$: C, 46.84; H, 2.95; N, 6.83. Found: C, 47.04; H, 2.93; N, 6.58.

Example 4.—4-trifluoromethylsalicylic acid hydrazide

Eleven grams of methyl 4-trifluoromethylsalicylate were added dropwise to a refluxing solution of 3 ml. of 85% hydrazine hydrate and 10 ml. absolute ethanol. After the addition of water, 10.5 g. of crude material were removed. This material consisted of the desired hydrazine and a product melting at about 325° C. which is believed to be di(4-trifluoromethylsalicylic acid) hydrazine. After several recrystallizations from ethanol, 3.5 g. of white, crystalline 4-trifluoromethylsalicylic acid hydrazide, M.P. 170.5–171.5° C., were isolated.

Analysis.—Calcd. for $C_8H_7O_2N_2F_3$: C, 43.64; H, 3.21; N, 12.73. Found: C, 43.93; H, 3.36; N, 12.74.

Upon heating, the pure hydrazide melted to a clear colorless liquid at 171° C. and upon continued heating formed a new solid at 180–181° C. with liberation of a gas. The new product melted at 319–321° C., with some decomposition. It is believed that diacyl hydrazide formation took place.

*Example 5.—4-trifluoromethylsalicylhydroxamic acid*

Ten grams of methyl 4-trifluoromethylsalicylate were added with stirring to a mixture of 6.95 g. of hydroxylamine hydrochloride, 11.8 g. of potassium hydroxide, 160 ml. of water, and 100 ml. of ethanol. The reaction mixture was allowed to stand at room temperature for one day. After addition of hydrochloric acid and recrystallization from ethanol, 8.5 g. of pale pink, almost white, 4-trifluoromethylsalicylhydroxamic acid, M.P. 185.5–186.0° C. were obtained.

*Analysis.*—Calcd. for $C_8H_6O_3NF_3$: C, 43.45; H, 2.74; N, 6.34. Found: C, 43.74; H, 2.70; N, 6.45.

The amino 4-trifluoromethylsalicylates of this invention are particularly useful as anti-mildew and fungicidal agents on cotton fabrics and cordage. In service the presence of the trifluoromethyl radical on the aromatic ring of the salicylate enhances the potency of the compound over that of the comparable known amino salicylates.

The use of an amino 4-trifluoromethylsalicylate as an anti-mildew and fungicidal agent is demonstrated by the following example.

*Example 6*

Ten parts by weight of 4-trifluoromethylsalicylamide are dispersed in 100 parts of water made slightly alkaline with sodium hydroxide. Cotton sheets are dipped into the solution, extracted and dried. The process is repeated if necessary until about 0.1% to about 0.5% based on the weight of the cloth of 4-trifluoromethylsalicylamide is deposited thereon. The sheets are thereby rendered resistant to growth of erysiphaceous fungi between laundering periods.

In a manner similar to that described in Example 6, 4-trifluoromethylsalicylanilide, 4-trifluoromethylsalicylic acid hydrazide and 4-trifluoromethylhydroxyamic acid can be prepared and used to mildewproof cotton and other cellulosic materials. All of my novel amino 4-trifluoromethylsalicylates may also be formulated into water-based wall paints where they will act as pesticidal agents.

Many different embodiments of this invention may be made without departing from the spirit and scope thereof, and it is to be understood that my invention includes also such embodiments and is not to be limited by the above description.

I claim:

1. Amino 4-trifluoromethylsalicylates represented by the formula

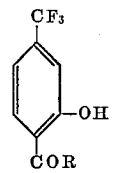

wherein R is a member selected from the class consisting of amino, phenylamino, hydrazino, and hydroxylamino.

2. The compound 4-trifluoromethylsalicylamide.
3. The compound 4-trifluoromethylsalicylanilide.
4. The compound 4-trifluoromethylsalicylic acid hydrazide.
5. The compound 4-trifluoromethylsalicylhydroxamic acid.
6. The compound methyl 4-trifluoromethylsalicylate.

References Cited in the file of this patent

Hauptschein et al.: J. Am. Chem. Soc., 76, 1052, 4476–7, (1954).

---

UNITED STATES PATENT OFFICE
CERTIFICATION OF CORRECTION

Patent No. 2,967,194        January 3, 1961

Murray Hauptschein

It is hereby certified that error appears in the above numbered patent requiring correction and that the said Letters Patent should read as corrected below.

Column 2, lines 16 and 17, for "4-fluoromethylsalicyl" read -- 4-trifluoromethylsalicyl --; lines 22 and 23, for "4-fluoromethylsalicylic" read -- 4-trifluoromethylsalicylic --.

Signed and sealed this 23rd day of May 1961.

(SEAL)
Attest:

ERNEST W. SWIDER        DAVID L. LADD
Attesting Officer        Commissioner of Patents

UNITED STATES PATENT OFFICE

CERTIFICATION OF CORRECTION

Patent No. 2,967,194                           January 3, 1961

Murray Hauptschein

It is hereby certified that error appears in the above numbered patent requiring correction and that the said Letters Patent should read as corrected below.

Column 2, lines 16 and 17, for "4-fluoromethylsalicyl" read -- 4-trifluoromethylsalicyl --; lines 22 and 23, for "4-fluoromethylsalicylic" read -- 4-trifluoromethylsalicylic --.

Signed and sealed this 23rd day of May 1961.

(SEAL)
Attest:

ERNEST W. SWIDER                              DAVID L. LADD
Attesting Officer                                Commissioner of Patents